US00RE37511B1

(19) United States
(12) Reissued Patent
Manzer et al.

(10) Patent Number: US RE37,511 E
(45) Date of Reissued Patent: Jan. 15, 2002

(54) PRINTER DEVICE FOR PRINTING WEB-SHAPED RECORDING MEDIA HAVING DIFFERENT WEB WIDTHS

(75) Inventors: Hans Manzer, Seefeld; Manfred Viechter, Walpertskirchen, both of (DE)

(73) Assignee: Océ Printing Systems GmbH, Poing (DE)

(21) Appl. No.: 09/354,382

(22) Filed: Jul. 14, 1999

Related U.S. Patent Documents

Reissue of:
(64) Patent No.: 5,659,875
Issued: Aug. 19, 1997
Appl. No.: 08/621,163
Filed: Mar. 22, 1996

U.S. Applications:

(63) Continuation of application No. 08/428,160, filed as application No. PCT/EP94/01493 on May 9, 1994, now Pat. No. 5,546,178.

(30) Foreign Application Priority Data

May 19, 1993 (DE) ..... 93108219

(51) Int. Cl.[7] ..... G03G 15/00
(52) U.S. Cl. ..... 399/384; 399/397; 399/401
(58) Field of Search ..... 399/384, 23, 388, 399/397, 400, 401; 355/23; 178/4; 346/136; 358/501, 296

(56) References Cited

U.S. PATENT DOCUMENTS 5,408,302 A * 4/1995 Maner et al. ..... 355/23
5,542,487 A * 8/1996 Schultz et al. ..... 178/4.1
5,568,245 A * 10/1996 Ferber et al. ..... 399/384

FOREIGN PATENT DOCUMENTS

EP 154695 * 9/1985
EP 478820 * 4/1992

OTHER PUBLICATIONS

Sanders; Two–Path Electrophotographic Print Process; IBM Technicl Disclosure Bulletin; vol. 22, No. 6, Nov. 1997.*
McIrvine; Method for Duplex Printing on Continuous Web Paper; Xerox Disclosure Journal; vol. 9, No. 3, May 1984.*
E. C. McIrvine, "Method for Duplex Printing on Continuous Web Paper", Xerox Disclosure Journal, vol. 9, No. 3 May/Jun. 1984, pp. 201–203.
K. Sanders, "Two–Path Electrophotographic Print Process", IBM Technical Disclosure Bulletin, vol. 22, No. 6, Nov. 1979, pp. 2465–2466.

* cited by examiner

*Primary Examiner*—Quana Grainger
(74) *Attorney, Agent, or Firm*—Hill & Simpson

(57) ABSTRACT

An electrographic printer device is designed for printing web-shaped recording media (10) having different web widths in different operating modes, such as single-colored and multi-colored simplex printing, single-colored and multi-colored duplex printing and for simultaneously printing two recording medium webs in parallel operation. To this end, the units of the printer device such as intermediate carrier (11), transfer printing station (15) and fixing station (18) comprise a usable width of at least twice the web width of a narrow recording medium. The printer device further contains a deflection means (28) following the fixing station (18) and engageable as needed and having an allocated return channel to the transfer printing station (15) via which the recording medium (10) is turned and resupplied to the transfer printing station (15) in single-color or multi-color duplex mode.

10 Claims, 6 Drawing Sheets

PRINTER DEVICE FOR PRINTING WEB-SHAPED RECORDING MEDIA HAVING DIFFERENT WEB WIDTHS

Matter enclosed in heavy brackets [ ] appears in the original patent but forms no part of this reissue specification; matter printed in italics indicates the additions made by reissue.

This is a continuation of application Ser. No. 08/428,160, filed as PCT/EP94/01493, May 9, 1994, U.S. Pat. No. 5,546,178.

BACKGROUND OF THE INVENTION

1. Field of the Invention

The invention is directed to an electrographic printer device for printing web-shaped recording media having different web widths with a possible return of the recording medium from the fixing station to the transfer printing station for producing duplex and color printing.

2. Description of Related Art

A high economic customer benefit and a broad flexibility are increasingly expected to modern electrographic printer systems. Both the effective utilization of materials to be printed as well as the flexible design of the print information thereby play a great part.

Continuous processing (fan fold) paper electrographic printer systems that can print a web-shaped recoding medium on one side have prevailed everywhere in the marketplace wherein high device availability given great printing volume and a broad spectrum of materials to be printed on are required. These printer systems, however, have the disadvantage that it is not possible to change between single-sided and double-sided printing. For the user, this leads both to an economically unfaorable situation as well as running contrary to the contemporary demands made of raw material utilization. Many customer-associated uses that absolutely require two-sided printing (brochures, books, etc.) can thus not be satisfied, especially since electrographic high-performance printers are especially economical when they are operated without interruption insofar as possible.

For producing multi-color printing and printing of the reverse side of the page with electrographic printer devices working with continuous stock, European Patent Publication EP-B1-01 54 695 discloses that two continuous stock printers be operated following one another, whereby the paper printed in the first printer is turned over and is subsequently printed on the second side in the second printer.

The outlay for such device is substantial due to the required, second printer.

The reference, IBM Technical Disclosure Bulletin, Vol. 22, No. 6, November 1979, pp. 2465–2466, also discloses an electrophotographic printer device for printing web-shaped recording media, with which it is possible to print the recording medium on both sides. To this end, the recording medium is taken from a supply stack, is supplied to a transfer printing station and is provided with toner images on one side. After fixing of the image on the medium, the recording medium is turned over and is again supplied to the transfer printing station. After printing the reverse side of the recording medium with toner images, another fixing in the fixing station ensues.

This old reference fundamentally describes duplex printing with continuous stock recording media. The proposal, however, never led to a procedure. Further, said electrographic printer device is only suitable for both-sided printing of the recording medium. Switching between on sided and two sided printing operating modes is not provided.

The reference XEROX DISCLOSURE JOURNAL, Vol. 9, Bo. 3, May 1984, Stanford, Conn., USA, pages 201 through 203 describes methods for duplex printing with a web-shaped recording medium using differently constructed electrophotographic printer devices. In a first duplex printing method, a toner image is first applied to a front side of the recording medium and the recording medium together with the toner image is then turned over and, simultaneously with or immediately before the turn-over operation the toner image is fixed by a first fixing means attached in the region of the turn-over means. A toner image of the reverse side is subsequently applied with the assistance of the transfer printing station, this being then in turn fixed with the assistance of a further fixing means attached at the output side with reference to the printer device. In a second method for producing duplex printing, a toner image of the front side is first applied with the assistance of the transfer printing station. After this, the recording medium is turned over and the application of the toner image of the reverse side ensues. Both toner images are then simultaneously fixed via a fixing station arranged at the output side. In a third method for producing simplex printing or a narrow or double width recording medium, the application of the sole toner image ensues with a transfer printing station that is appropriately adapted in width, to the recording medium whereby the toner image is then fixed via a width-adapted fixing station at the output side.

Switching between the individual operating modes, for example duplex and simplex printing, within a single printer device with corresponding adaptation of the paper conveying means is not provided. A special fixing station structure, moreover, is proposed for every operating mode.

As already set forth at the outset, electrographic printer devices are utilized for operation with web-shaped recording media when a high printing speed in combination with high printing quality is required. Precisely when processing high print volumes such as represented, for example, by accounting documents, statements of account, fee statements and the like, however, it can be beneficial to print, for example, in two colors in order to more clearly identify specific areas of the forms. Multi-colored printing, however, normally involves substantial outlay and reduces the printing speed.

SUMMARY OF THE INVENTION

An object of the invention is to provide an electrographic printer device for printing web-shaped recording media in changing operating modes with one and the same device that is flexibly constructed and that enables an adaptation to the greater variety of user demands by the user in a simple way.

In an electrographic printer device of the species initially cited, this object is achieved by an intermediate carrier having appertaining units such as an image-generating means, a developer station, a charging station, a cleaning station for generating toner images on the intermediate carrier that comprises a usable width of at least twice the web width of a narrow recording medium; a transfer printing station that is allocated to the intermediate carrier and accepts the recording medium, and that comprises a usable width of at least twice the web width of the narrow recording medium, a single fixing station following the transfer printing station in a conveying direction of the recording medium for fixing the toner images on the recording medium, the fixing station comprising a usable width of at least twice the web width of the narrow recording medium; and a deflection means that follows the fixing station and that can be added in dependence on the operating mode for the narrow recording medium and having an allocated return channel to the transfer printing station, whereby in a first operating mode of the printer device for multiple printing of the single, narrow recording medium, the recording medium is conducted to a use area of the fixing station via the transfer printing station proceeding from a delivery region and is resupplied to the transfer printing station and a use area of the same fixing station neighboring the use area via the deflection means proceeding from the use area of the fixing station; and in a second operating mode of the printer device for single-sided printing of one or more recording media having different web width, the recording medium or media is/are conducted to the single fixing station only via the transfer printing station proceeding from a delivery region.

Advantageous embodiments of the invention are provided by a deflection means that is fashioned as a page turn-over means such that the single, narrow recording medium is supplied to the transfer printing station turned over with respect to its front and reverse sides compared to its original supplied position.

In a further development, a deflection means that is fashioned such that, in a first operating mode, the deflection means supplies the single, narrow recording medium to the transfer printing station turned with respect to its front and reverse sides compared to its original delivery attitude and such that, in a second operating mode, the deflection means supplies the single, narrow recording medium to the transfer printing station in its original delivery attitude. One or more developer stations generating separately inkable developer zones on the intermediate carrier, may be provided whereby a corresponding developer zone on the intermediate carrier is allocated to at least each position region of the narrow recording medium upon passage through the transfer printing station. A conveyor means is allocated to the transfer printing station and engages into margin perforations of the recording medium, the conveyor means being adjustably fashioned depending on the operating mode of the printer device.

In a preferred embodiment, an LED character generator extending at least over the useable width of the intermediate carrier is provided as the image-generating means.

A method for both-sided, multi-colored printing of a web-shaped recording medium with an electrographic printer device is also provided, comprising the following steps:

applying a first sequence of toner images of a first color onto the front side of the recording medium in a first pass through the transfer printing station;

fixing the first sequence of toner images in the fixing station;

front to reverse side turning of the recording medium in the deflection means and redelivering of the recording medium to the transfer printing station;

applying a second sequence of toner images in a second color on the reverse side of the recording medium; and fixing the second sequence of toner images in the fixing station.

The method for multi-colored printing of a web-shaped recording medium with an electrographic printer device may instead include the steps of:

applying a first sequence of toner images in a first color onto the front side of the recording medium in a first pass through the transfer printing station;

fixing the first sequence of toner images in the fixing station;

redelivering the recording medium to the transfer printing station;

applying a second sequence of toner images with a second color on the front side of the recording medium; and fixing the second sequence of toner images in the fixing station.

The electrographic printer device of the invention comprises a usable width of at least twice the web width of a narrow recording medium. A deflection means that follows the fixing station for the narrow recording medium is adjustably fashioned, namely dependent on the operating condition of the printer device. For multiple printing of a single, narrow recording medium, for example for producing single-color or multi-color duplex printing or for producing multi-colored simplex printing, the recording medium is conducted over the transfer printing station to the fixing station and from the latter via the deflection means back to the transfer printing station and to the fixing station. For single-sided printing of a recording medium having a web width that is broader than that of the narrow recording medium or for printing a plurality of narrow recording media in parallel operation, a guidance of the recording medium ensues only over the transfer printing station to the fixing station.

In order to be able to print multi-color images, the intermediate carrier comprises developer stations having separately inkable developer zones.

The printer device employs a single fixing station designed according to accommodate the maximum recording medium width. The single fixing station is employed for all recording medium widths and in all operating modes. An adaptation of the device to the different operating modes ensues by simple add-in and switching, for example of the deflection means.

A conveyor means that is allocated to the transfer printing station and that engages margin perforations of the recording medium is fashioned to be adjustable depending on the operating mode of the printer device. The conveyor means can also be fashioned for conveying recording medium that are free of conveying holes.

A simple adaptation of the conveyor means to the greatest variety of recording medium widths is thus possible.

Without increasing the apparatus-oriented outlay compared to traditional machines, the electrographic printer device of the invention enables with one and the same device the printing of broad recording media in broadside (landscape) and long (portrait) format, the printing of narrower recording media in duplex mode, i.e. with front side and reverse side printing both in a single-color in multi-colored images, multi-colored, single-sided printing and the printing of a plurality of recording media in parallel mode.

Despite the significant enhancement in function, the device dimension, the manufacturing costs as well as the operating reliability and the dependability correspond to those of known printer machines, a need for a flexibly employable, electrographic printer device that has existed for many years being thus satisfied.

BRIEF DESCRIPTION OF THE DRAWINGS

Embodiments of the invention are shown in the drawings and shall be set forth in greater detail below by way of example. Shown are.

DETAILED DESCRIPTION OF THE PREFERRED EMBODIMENTS

Figure 1A:
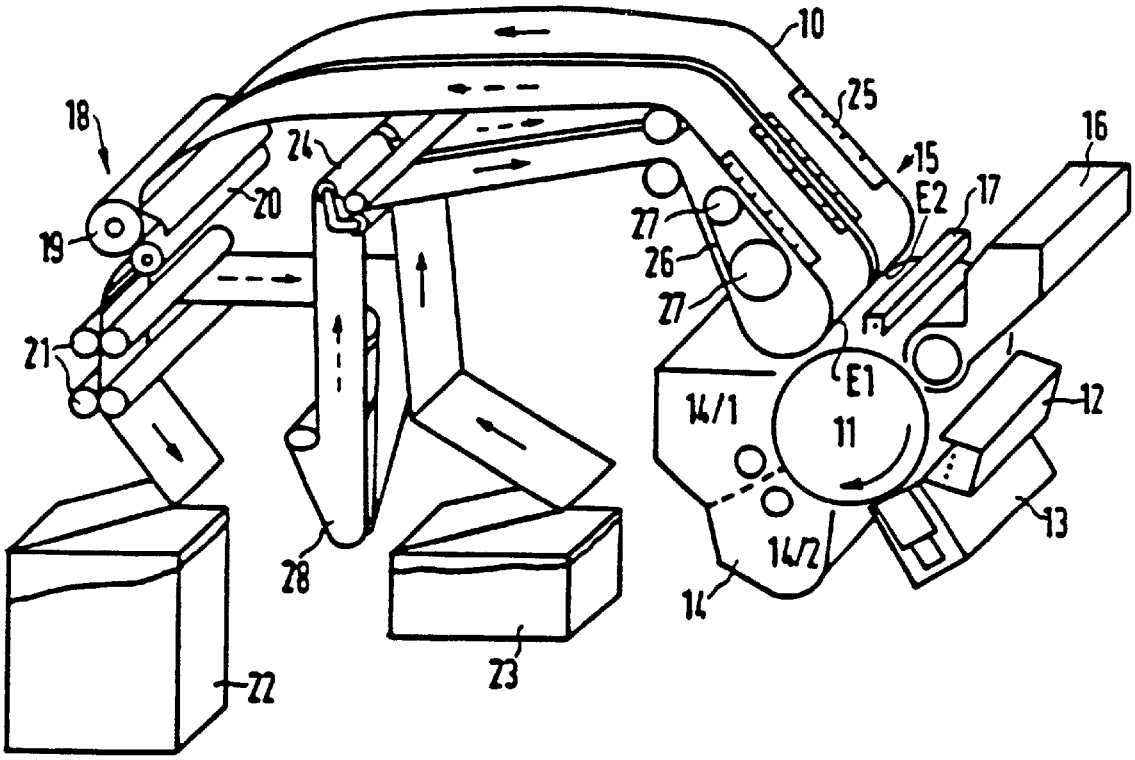
FIG. 1 a schematic illustration of an electrographic printer device for printing web-shaped recording media in duplex mode.

As an intermediate carrier 11, an electrographic printer device for printing web-shaped recording media 10 of different web widths contains an electromotively driven photoconductor drum. However, a web-shaped intermediate carrier, for example an OPC web can be employed instead of the photoconductor drum, as can a magneto-styli arrangement as disclosed, for example, by EP-B1-0 191 521. The various units for the electrographic process are grouped around the intermediate carrier 11. Essentially, these are: a charging device 12 in the form of a charging corotron for charging the intermediate carrier 11; a character generator 13 having a light-emitting diode comb for character-dependent exposure of the intermediate carrier 11 with a latent image, the character generator extending over the entire usable width of the intermediate carrier 11; a developer station 14 for inking the character-dependent latent image on the intermediate carrier 11 with the assistance of a one-component or two-component developer mix; a transfer printing station 15 that extends over the width of the intermediate carrier 11 and with which the toner images are transferred onto the recording medium 10. For removing the residual toner after the development and after the transfer printing, a cleaning station 16 is provided having a cleaning brush with appertaining suction device integrated therein as well as a discharge means 17. The intermediate carrier 11 is electromotively driven and is moved in direction of the arrow when in the print mode.

The printer device also contains a fixing station 18 that follows the transfer printing station 15 in the conveying direction of the recording medium, this fixing station 18 being fashioned as a thermal transfer printing station having a heated fixing drum 19 with an appertaining pressure roller 20 as well as guide rollers 21 following the fixing station that, among other things, serve as delivery elements for a stacker means 22 for the recording medium 10. Other fixing stations, for example with a heated or unheated admission saddle or a cold-fixing station are also possible instead of the illustrated fixing station. The web-shaped recording medium 10, for example, is fabricated as a pre-folded continuous stock provided with margin perforations and is supplied to the transfer printing station via delivery rollers 24 proceeding from a supply region 23. However, it is also possible to supply a recording medium without margin perforations via a roller feed.

The conveying of the recording medium thereby preferably ensues via a conveyor means 25 allocated to the transfer printing station 15 in the form of conveyor belts provided with pins that, guided via drive shafts 27, engage into the margin perforations of the recording medium 10. When a recording medium that is free of conveying holes is employed, it is within the skill of a person skilled in the art to provide an adapted conveyor means that conveys the recording medium with, for example, friction controlled by a control arrangement that senses synchronization marks. Further, a deflection means 28 is arranged in the housing area of the printer device between a supply area 23 and the fixing station 8, the function of this deflection means 28 to be set forth later and this deflection means 28 returning the recording medium from the fixing station 18 to the transfer printing station 15.

The printer device is controlled via a printer controller that is schematically shown here and that has a central unit CPU, a page memory SP that is divided into memory areas in a page-dependent fashion and also has a data control unit DC. All units of the controller are connected to one another and to the units of the printer device via a bus system.

The electrographic printer device is suitable for printing recording media having different web width. To this end, the intermediate carrier 11 (photoconductor drum) comprises a usable width that corresponds to the greatest possible recording medium width (for example, a format DIN A3 broadside landscape. This width corresponds to twice the DIN A4 web width. It is thus possible to arrange two recording medium widths DIN A4 longitudinally side-by-side in the area of the transfer printing station 15. The fixing station 18 and the other electrophotographic units such as a developer station 14, a character generator 13, the cleaning station 16 are designed corresponding to this usable width.

An adaptation of the width of the character generator 13 to different recording medium widths requires no mechanical modification at the character generator when, as in this case, a LED character generator is employed which comprises a plurality of LEDs arranged in rows. An adaptation to the width of the recording medium employed ensues electronically by selection.

The conveyor means can be fashioned width-adjustable for adaptation of the conveyor means 25 to different recording medium widths. For example, this can be achieved in that the drive wheels that carry the conveyor belts (nub belts) that engage into the margin perforations of the recording medium are displaceably seated on polygonal shafts.

When two narrow recording media are arranged and conveyed side-by-side in the area of the transfer printing station 15, then it is normally sufficient to provide a conveyor means only for the respectively outwardly disposed margin perforations. Given an appropriate design, it is therefore possible to employ the same conveyor belts for the broad recording medium and the two narrower recording media without having to adjust these conveyor belts. If it is nonetheless necessary to guide the recording media at both sides, then centrally separated conveyor elements that engage into the margin perforations of the recording media can be provided for the mode with two narrow recording media arranged side-by-side. So that these conveyor elements do not represent a disturbing factor given operation with only one broad recording medium, they can be pluggably and unpluggably or pivotably arranged or, on the other hand, it is possible to provide the drivewheels 27 of the conveyor means 25 with engageable and disengagable pins or, respectively, nubs.

The deflection means 28 arranged in a return channel for narrow recording media from the fixing station to the transfer printing station has two tasks: in continuous mode (FIG. 6), it serves the purpose of lateral adjustment of the recording medium web and, in turn-over mode (FIG. 7), it serves the purpose of front/reverse side turning of the recording. It is fashioned as switchable between the two dependent on the operating mode. Three deflection elements 29/1, 29/2 and 29/3 that are fashioned as drums or deflection rods having a smooth, wear-resistent surface serve for the vertical excursion of the recording medium. Given a corresponding arrangement of the deflection means in the printer device in accordance with the exemplary embodiments of FIGS. 1–3, the function of the deflection element 29/2 can be assumed by the delivery rollers 24. Further, the deflection means contains a deflection contour composed of two deflection rods 30/1 and 30/2 that are arranged inclined by 45° relative to the conveying direction of the recording medium in the illustrated exemplary embodiment. The second deflection rod 30/2 as viewed in the conveying direction of the recoding medium is arranged pivotable via a mechanism that is not shown here, namely from a position parallel to the first deflection rod 30/1 into a position perpendicular thereto. The deflection rods 30/1 and 30/2 should not be fashioned as rotating drums since the recording medium would laterally escape during the rolling motion. They are fashioned as a stationary drum or as a corresponding shaped part. Since the recording medium, which is usually composed of paper, wipes over the surface, it is advantageous to select a smooth and wear-resistant coating and/or to blow air through openings that can lie in the contact surface and to thereby provide an air pillow. The horizontal deflection elements 29/1–29/3 can be fashioned as rotatable drums or, corresponding to the deflection contour, as stationary deflection rods, potentially with air exit openings.

Figure 6:
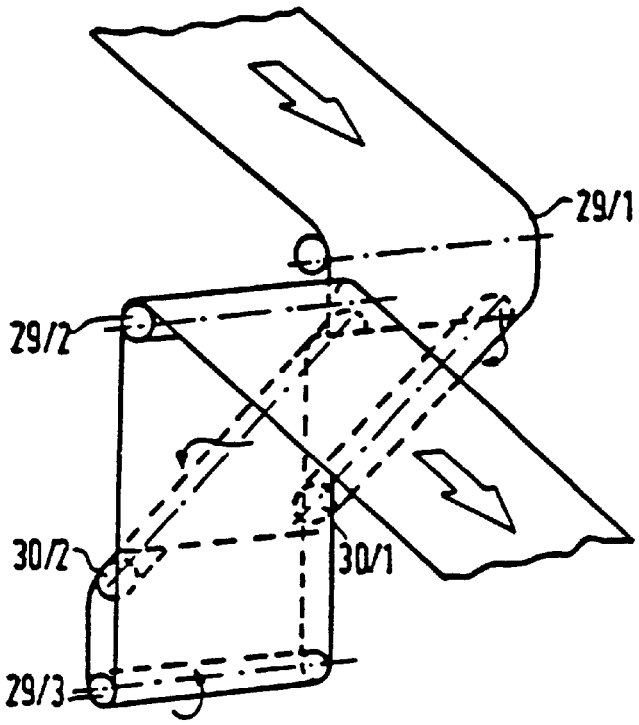
FIG. 6 a schematic illustration of a deflection means arranged in the electrographic printer device in continuous mode (simplex printing)

In the continuous mode shown in FIG. 6, the recording medium returned from the fixing station 18 is first deflected downward via the deflection drum 29/1 and is then guided around the deflection rod 30/1 in accordance with the arrow direction and is thus horizontally deflected. Another deflection around the deflection rod 30/2 downward in the vertical direction follows thereupon. After another deflection by the horizontal deflection drum 29/3, the width-offset recording medium is supplied to the deflection element 29/2 or, respectively, to the delivery rollers 24.

Figure 7:
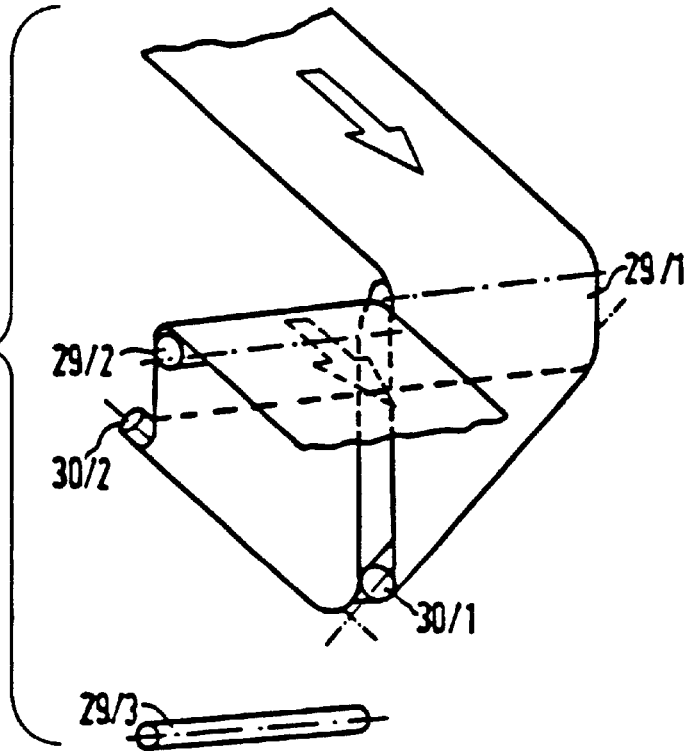
FIG. 7 a schematic illustration of the same deflection means in turn-over mode (duplex printing).

The recording medium is turned by 180° in the illustrated way in the turning position of the deflection means shown in FIG. 7. The recording medium is thereby first deflected downward over the horizontal deflection roller 29/1, is guided from front to back around the first oblique deflection rod 30/1 and it thus horizontally deflected. Another deflection around the second oblique deflection rod 30/2 ensues thereafter, with following delivery to the horizontal deflection element 29/2 or, respectively, to the delivery rollers 24.

Function of the Electrographic Printer Device in Different Operating Modes

Simplex Mode

Figure 4:
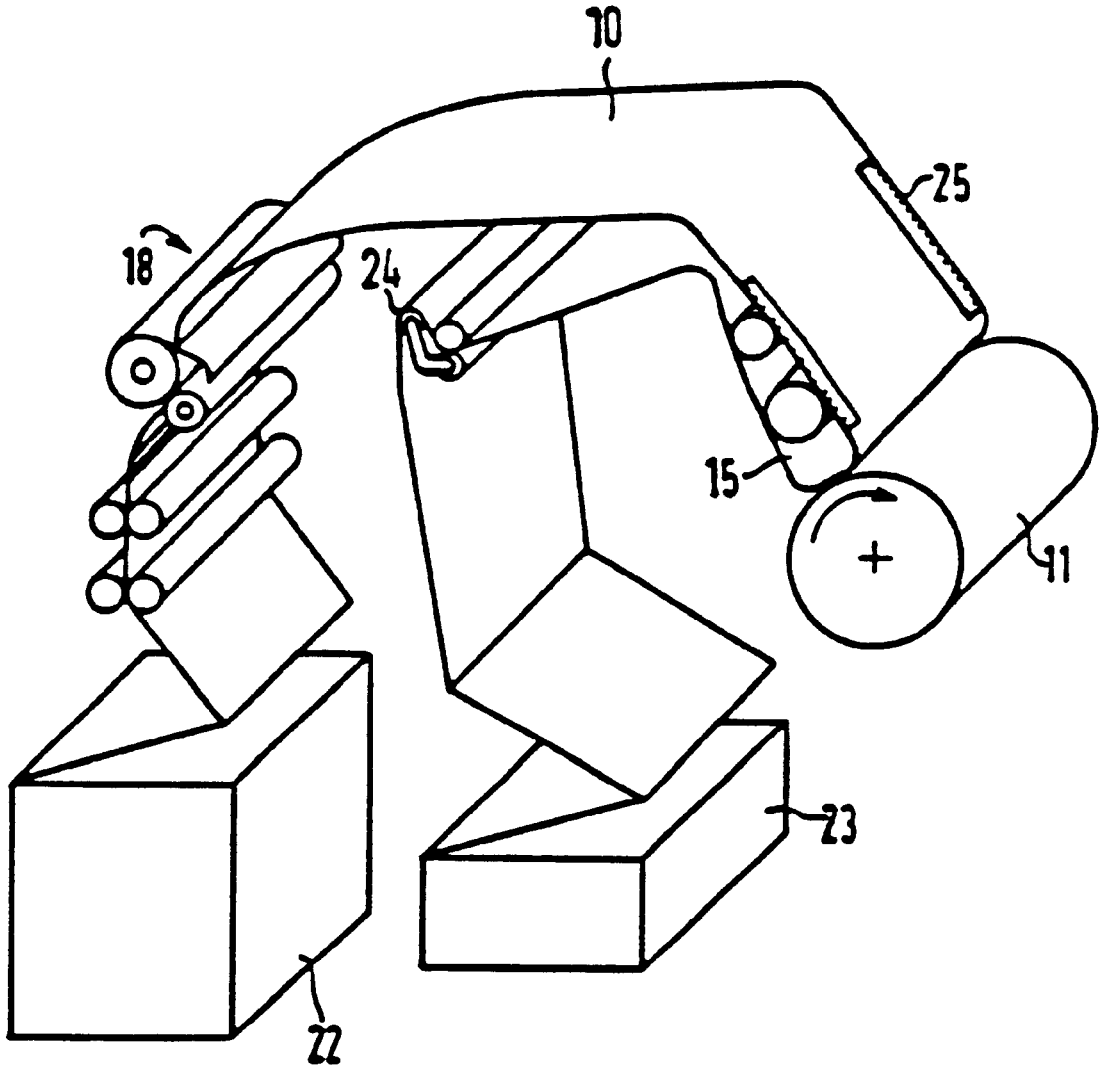
FIG. 4 a schematic illustration of the same printer device in simplex mode for printing a broad, web-shaped recording medium.

The inventive printer device enables the greatest variety of operating modes without modifying the hardware structure. For single-sided printing of a broad recording medium corresponding to the illustration of FIG. 4, the recording medium is conducted to the transfer printing station 15 via the delivery rollers 24 in a conventional way proceeding from the supply region 23 (supply stack), is provided with toner images in the transfer printing station 15 and is fixed in the fixing station 18, and is subsequently deposited in the stacking means 22. The conveying thereby ensues via the conveyor means 25 that engages into the margin perforations of the recording medium, whereby the width of the conveyor means 25 is set to correspond to the width of the recording medium.

Such a broad recording medium, for example, enables printing with DIN A3 toner images arranged broadside or, on the other hand, with two toner images DIN A4 arranged side-by-side.

Figure 5:
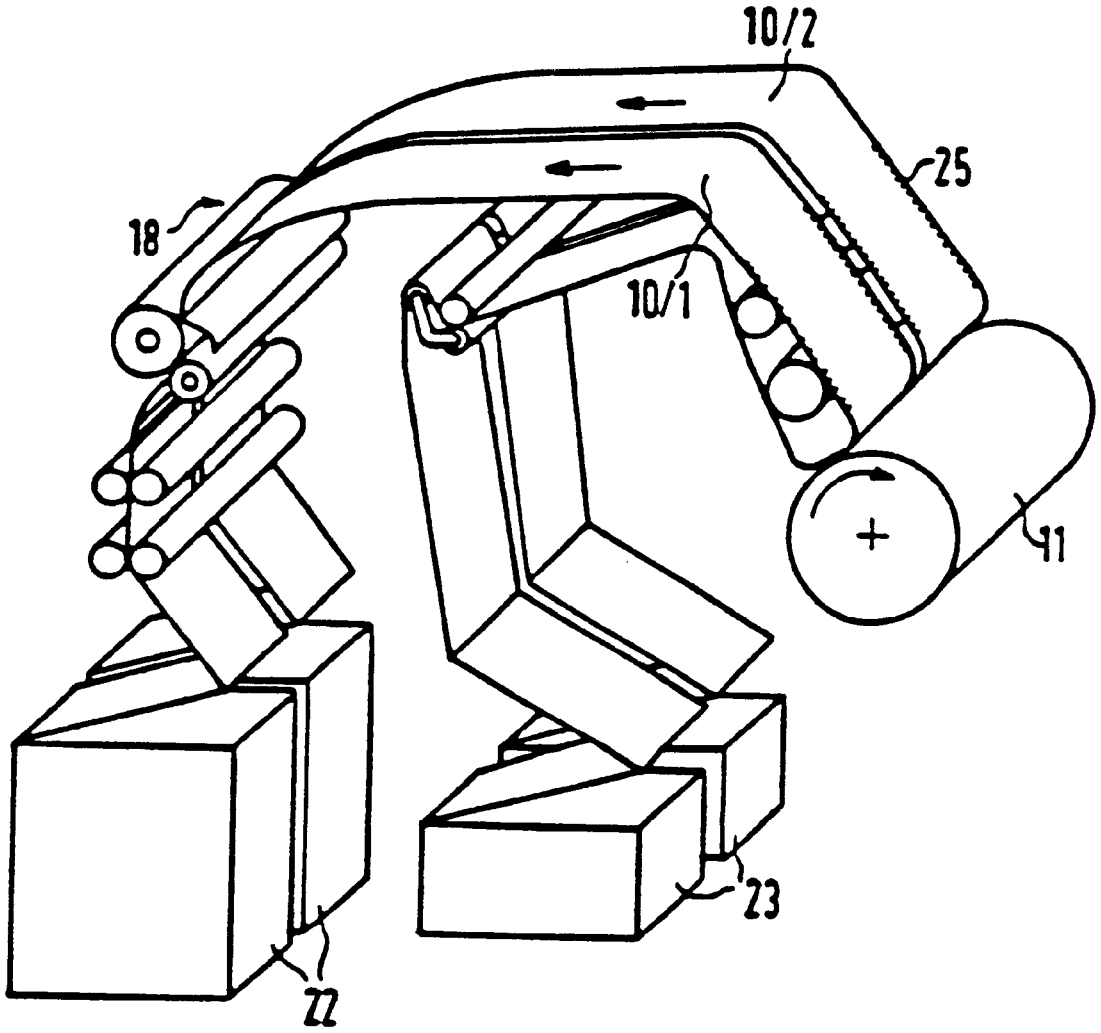
FIG. 5 a schematic illustration of the same electrographic printer device in simplex mode for simultaneously printing two web-shaped recording media.

For printing two narrow recording media, for example having a width DIN A4, that are arranged side-by-side, the two recording medium webs 10/1, 10/2 are conducted parallel through the printer device corresponding to the illustration of FIG. 5. The conveying of the recording medium webs 10/1 and 10/2 ensues via the appropriately set conveyor means 25. In the illustrated exemplary embodiment the recording medium webs 10/1 and 10/2 are conveyed at both sides via their margin perforations. As already set forth, the middle conveyor elements can be brought into engagement for this purpose with the inner margin perforations of the recording medium webs 10/1 and 10/2 by extending corresponding pins. It is also possible to fashion these inner conveyor elements as elements that can be put in place as needed. Fundamentally, it is also possible for conveying the recording medium webs 10/1 and 10/2 to employ only the outer conveyor elements in the region of the transfer printing station and to thus convey the recording medium webs at one side.

Single-Color Duplex Mode

Figure 1B:
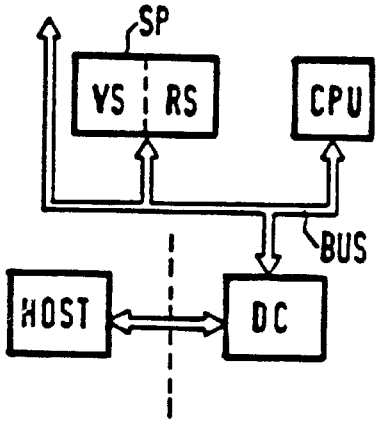

For both-sided, single-color printing of a narrow recording medium in duplex mode, as shown in FIG. 1, the narrow recording medium which, for example, is DIN A4 wide is supplied to the transfer printing station 15 over the delivery rollers 24 proceeding from the supply area 23 and is printed on its topside with a front side toner image. The front side of the recording medium 10 is thereby identified by solid conveying arrows and the bottom side is identified by broken-line conveying arrows. After this, the recording medium with the front side toner image is supplied to the fixing station 18 and the front side toner image is fixed. Further conveying of the recording medium to the deflection means 28 ensues via the guide rollers 21, the deflection contour of the deflection means 28 being positioned in a turn-over attitude. The recording medium is turned over with respect to its front and reverse side in the deflection means 28 and is resupplied to the transfer printing station 15 over the delivery rollers 24 such that its reverse side can be provided with a reverse side toner image. After this, the recording medium is resupplied to the fixing station 18 and the reverse side toner image is fixed and, subsequently, the recording medium printed on both sides is deposited in the stacking means 22.

Since the front side and reverse side toner images are generated at different points in time and transfer-printed onto the recording medium, a corresponding data editing via the printer controller is necessary. To this end, the page memory SP contains memory areas VS for storing the front side image data and memory areas RS for storing the reverse side image data. The data editing thereby ensues via the data control means DC, whereby the data, proceeding from a data source (host), for example an external data storage, are supplied to the data control means DC via an interface. The data of the individual pages to be printed are thereby deposited in the page memory SP, namely separated according to front side VS and reverse side RS in the corresponding memory areas. The retrieval of the data then ensues temporally controlled, so that the desired front side/reverse side allocation of the toner images on the recording medium is achieved.

Two-Color Duplex Mode

The printer device is also suitable for multi-color printing mode. To this end, the developer station 14 can be fashioned such in accordance with the illustration of FIG. 2 that it generates separately inkable developer zones E1 and E2 on the intermediate carrier 11. A corresponding developer zone E1 or, respectively, E2 on the intermediate carrier 11 is thereby allocated to the narrow recording medium in every position region when it passes through the transfer printing station 15. For producing these separately inkable developer zones E1 and E2, the developer zones can each have respectively two developer stations 14/1 and 14/2 arranged following one another allocated to them. The developer station 14/1 thereby contains a toner mix of a first color, for example red, and the developer station 14/2 contains a developer mix in a second color, for example, black. The developer stations 14/1 and 14/2 are fashioned as separately activatable with respect to the developer zones E1 and E2, namely either on the basis of mechanical flaps or the like or on the basis of an electrical drive of the developer drums. Each of the developer stations 14/1 and 14/2 can extend over the entire width of the intermediate carrier 11; however, it must be assured that they are individually separately drivable with respect to the developer zones E1 and E2. However, it is also possible to fashion each of the developer stations 14/1 and 14/2 as two separate developer stations arranged side-by-side.

Figure 2A:
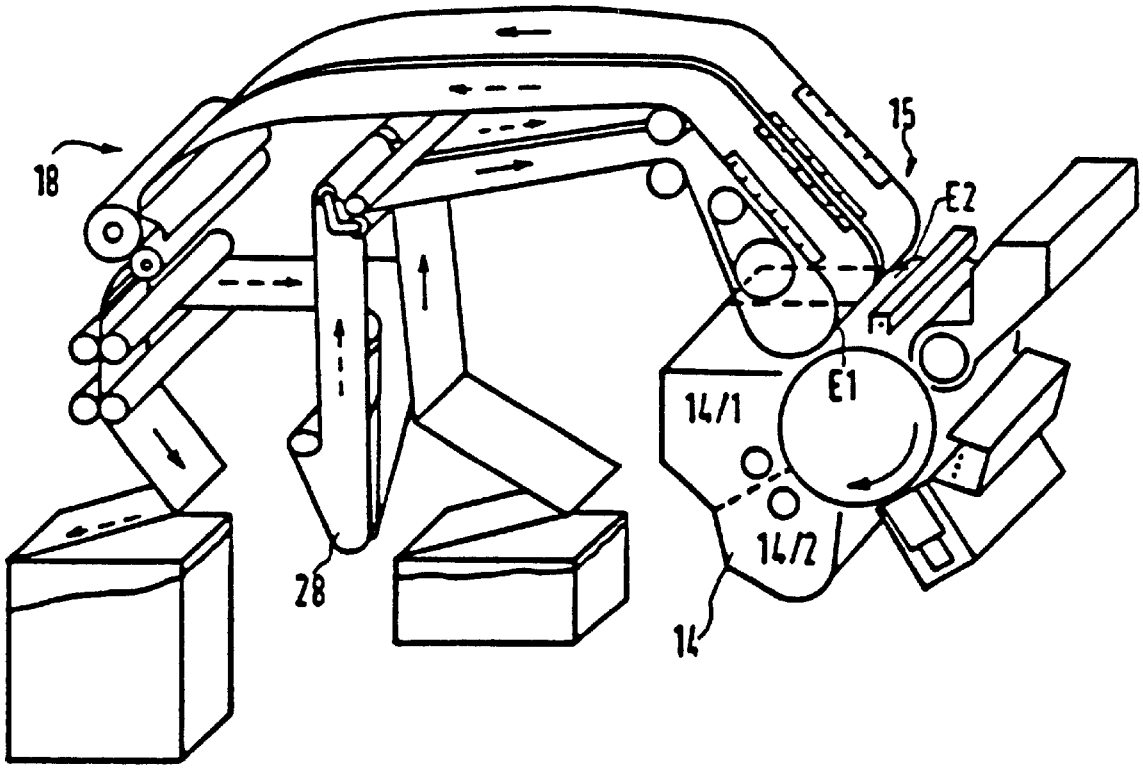
FIG. 2 a schematic illustration of the same electrographic printer device in two-color duplex mode.
Figure 2B:
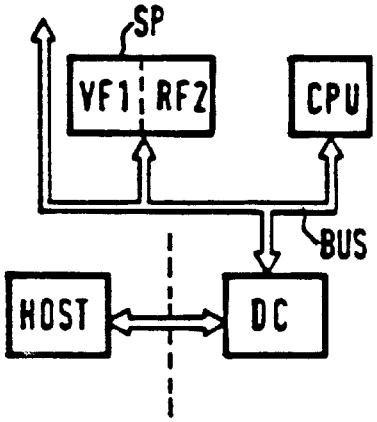

In order, corresponding to the illustration of FIG. 2, to be able to print a narrow recording medium with different colors on both sides, the recording medium is conducted through the printer device in the same way as in FIG. 1. In a first pass through the transfer printing station 15, the application of a front side image in a first color, for example red, ensues via the developer station 14/1 in the developer zone E2. In a second pass through the transfer station 15 following the turn-over event via the deflection means 28, a reverse side toner image in a second color, for example black, is applied via the developer station 14/2 in the developer zone E1. The control of the application of the toner image ensues in accordance with the exemplary embodiment of FIG. 1 via the printer controller, whereby the image data for the front side toner image of color 1 (red) are deposited in the memory area VF1 of the page memory and the image data for the reverse side toner image of color 2 (black) are deposited in the memory area RF2.

It should be noted that the separate developer stations 14/1, 14/2 can also be employed for both-sided, single-color printing of the recording medium in the duplex mode corresponding to FIG. 1. In this case, it is simply only one of the developer stations 14/1 or 14/2 that is activated dependent on the desired color.

Two-Color Simplex Mode

Figure 3A:
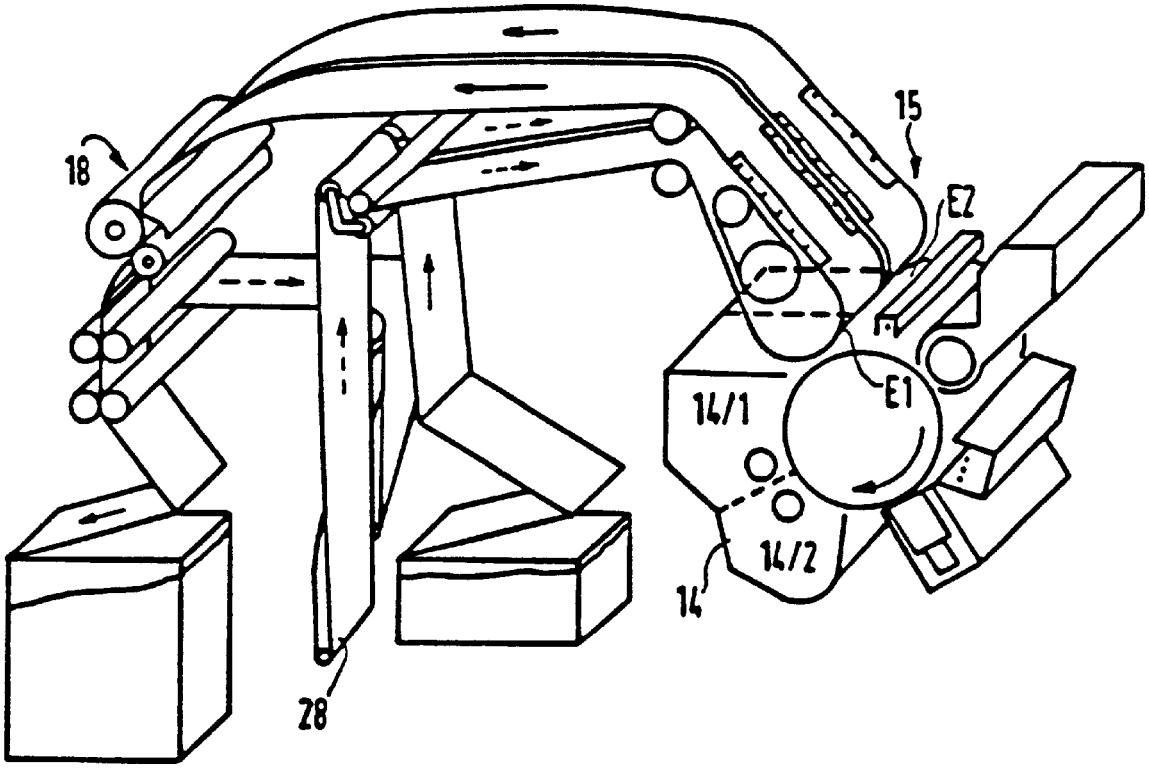
FIG. 3 a schematic illustration of the same electrographic printer device in two-color simplex mode.
Figure 3B:
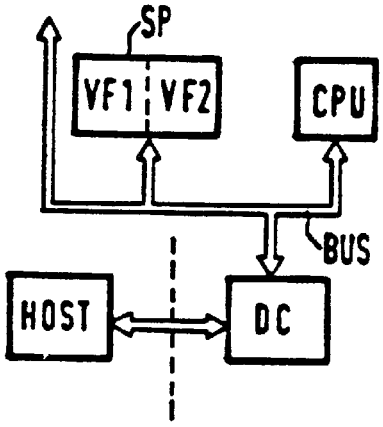

As shown in FIG. 3, it is possible to print a narrow recording medium having, for example, the width A4 with two colors on one side with the printer device. To this end, the developer station can be constructed in the way set forth in conjunction with FIG. 1. A separately inkable developer zone E1, E2 is thereby allocated to every recoding medium position on the transfer printing station. In a first pass through the transfer printing station 15, a toner image is thereby printed in a first color, for example red, via the developer zone E2. After this, the toner image of this first color is fixed in the fixing station 18 and, without turning over, the recording medium is resupplied to the transfer printing station 15 with the appertaining developer zone E1. The deflection means 28 is thereby in an operating condition as shown in FIG. 6, i.e. it is in the continuous run position and the recording medium is only offset in width upon retention of the front side/reverse side allocation. During the second pass through the transfer printing station, a second toner image having the second color (for example, black) is superimposed on the first, fixed toner image having the first color (red) and a two-color overall image is thus produced. The superimposed toner image is then fixed again in the fixing station 18 and the recording medium printed on one side is deposited in the stacking device 22.

Instead of superimposing toner images, it is also possible to arrange toner images having different colors offset relative to one another on the recording medium.

As in the exemplary embodiments of FIGS. 1 and 2, the control of the application of the toner images ensues via the printer controller. The memory area VF1 of the page memory SP thereby contains the image data of a front side image of color 1 (red) and the memory area VF2 of the page memory SP contains the image data of a front side color image of color 2 (black). The retrieval of the image data and the control of the developer station 14 ensues via the data control means DC in the way that has been set forth.

Although other modifications and changes may be suggested by those skilled in the art, it is the intention of the inventors to embody within the patent warranted hereon all changes and modifications as reasonably and properly come within the scope of their contribution to the art.

We claim:

1. An electrographic printer device for printing web-shaped recording media having different web widths, comprising:

an image printer including an intermediate carrier of a usable width of at least twice a web width of a narrow recording medium, an image-generating means for generating a charge image on said intermediate carrier, a developer station for developing the charge image as a toner image on said intermediate carrier a charging station for charging said intermediate carrier, and a cleaning station for cleaning unused toner from said intermediate carrier;

a transfer printing station that is allocated to said intermediate carrier and accepts the recording medium, and that is of a usable width of at least twice the web width of the narrow recording medium;

a single fixing station means following said transfer printing station in a conveying direction of the recording medium for fixing the toner image on the recording medium, said single fixing station being of a usable width of at least twice the web width of the narrow recording medium;

a deflection means that follows said single fixing station means for selectively redirecting the recording medium to said image printer depending on operating mode for the narrow recording medium, said deflection means having an allocated return channel to said transfer printing station, whereby in a first operating mode of said electrographic printer device for multiple printing of a single, narrow recording medium, the recording medium is conducted to a use area of said single fixing station via said transfer printing station proceeding from a delivery region and is resupplied to said transfer printing station and a use area of said single fixing station neighboring said use area via said deflection means proceeding from said use area of said single fixing station; and in a second operating mode of said electrographic printer device for single-sided printing of at least one recording media having different web width, the at least one recording media are conducted to said single fixing station only via said transfer printing station proceeding from the delivery region, and a conveyor means allocated to said transfer printing station and for conveying the recording medium through said electrographic printer device by frictionally engaging the recording medium, said conveyor means being selectively adjustable dependent on the operating mode of the printer device.

2. An electrographic printer device as claimed in claim 1, wherein the web-shaped recording media is provided with synchronization marks and further comprising:

means for reading the synchronization marks.

*3. A printer device for printing web-shaped recording media having different web widths, comprising:*

*an image printer including an intermediate carrier of a usable width of at least twice a web width of a narrow recording medium, an image-generating means for generating an intermediate image on said intermediate carrier, a developer station for developing the intermediate image as a toner image on said intermediate carrier, and a cleaning solution for cleaning unused toner from said intermediate carrier;*

*a transfer printing station that is allocated to said intermediate carrier and accepts the recording medium, and that is of a usable width of at least twice the web width of the narrow recording medium;*

*a single fixing station means following said transfer printing station in a conveying direction of the recording medium for fixing the toner image on the recording medium, said single fixing station being of a usable width of at least twice the web width of the narrow recording medium;*

*a deflection means that follows said single fixing station means for selectively redirecting the recording medium to said image printer depending on operating mode for the narrow recording medium, said deflection means having an allocated return channel to said transfer printing station, whereby*

*in a first operating mode of said printer device for multiple printing of a single, narrow recording medium, the recording medium is conducted to a use area of said single fixing station via said transfer printing station proceeding from a delivery region and is resupplied to said transfer printing station and a use area of said single fixing station neighboring said use area via said deflection means proceeding from said use area of said single fixing station; and*

*in a second operating mode of said printer device for single-sided printing of at least one recording media having different web width, the at least one recording media are conducted to said single fixing station only via said transfer printing station proceeding from the delivery region, and*

*a conveyor means allocated to said transfer printing station and for conveying the recording medium through said printer device by frictionally engaging the recording medium, said conveyor means being selectively adjustable dependent on the operating mode of the printer device.*

*4. A printer device as claimed in claim 3, wherein the web-shaped recording media is provided with synchronization marks and further comprising:*

*means for reading the synchronization marks.*

*5. A printer device for printing web-shaped recording media having different web widths, comprising:*

*an image printer including an intermediate carrier of a usable width of at least twice a web width of a narrow recording medium, an image generator mounted at said intermediate carrier and operable to generate an intermediate image on said intermediate carrier, a developer station for developing the intermediate image as a toner image on said intermediate carrier, and a cleaning station for cleaning unused toner from said intermediate carrier;*

*a transfer printing station that is allocated to said intermediate carrier and accepts the recording medium, and that is of a usable width of at least twice the web width of the narrow recording medium;*

*a single fixing station following said transfer printing station in a conveying direction of the recording medium for fixing the toner image on the recording medium, said single fixing station being of a usable width of at least twice the web width of the narrow recording medium;*

*a deflector that follows said single fixing station for selectively redirecting the recording medium to said image printer depending on operating mode for the narrow recording medium, said deflector having an allocated return channel to said transfer printing station, whereby*

*in a first operating mode of said printer device for multiple printing of a single, narrow recording medium, the recording medium is conducted to a use area of said single fixing station via said transfer printing station proceeding from a delivery region and is resupplied to said transfer printing station and a use area of said single fixing station neighboring said use area via said deflector proceeding from said use area of said single fixing station; and*

*in a second operating mode of said printer device for single-sided printing of at least one recording media having different web width, the at least one recording media are conducted to said single fixing station only via said transfer printing station proceeding from the delivery region, and*

*a conveyor allocated to said transfer printing station and for conveying the recording medium through said printer device by frictionally engaging the recording medium, said conveyor being selectively adjustable dependent on the operating mode of the printer device.*

*6. A printer device as claimed in claim 5, wherein the web-shaped recording media is provided with synchronization marks and further comprising:*

*a reader mounted to read the synchronization marks.*

*7. A printer device for printing web-shaped recording media having different web widths, comprising:*

*an image printer including an intermediate carrier of a usable width of at least twice a web width of a narrow recording medium, an image generator mounted at said intermediate carrier and operable to generate an intermediate image on said intermediate carrier, a developer station for developing the intermediate image as a toner image on said intermediate carrier, and a cleaning station for cleaning unused toner from said intermediate carrier;*

*a transfer printing station that is allocated to said intermediate carrier and accepts the recording medium, and that is of a usable width of at least twice the web width of the narrow recording medium;*

*a single fixing station following said transfer printing station in a conveying direction of the recording medium for fixing the toner image on the recording*

*medium, said single fixing station being of a usable width of at least twice the web width of the narrow recording medium;*

*a deflector that follows said single fixing station for selectively redirecting the recording medium to said image printer depending on operating mode for the narrow recording medium, said deflector having an allocated return channel to said transfer printing station, whereby*

*in a first operating mode of said printer device for multiple printing of a single, narrow recording medium, the recording medium is conducted to a use area of said single fixing station via said transfer printing station proceeding from a delivery region and is resupplied to said transfer printing station and a use area of said single fixing station neighboring said use area via said deflector proceeding from said use area of said single fixing station; and*

*in a second operating mode of said printer device for single-sided printing of at least one recording media having different web width, the at least one recording media are conducted to said single fixing station only via said transfer printing station proceeding from the delivery region, and*

*a conveyor allocated to said transfer printing station and for conveying the recording medium through said printer device by engaging the recording medium, said conveyor being selectively adjustable dependent on the operating mode of the printer device.*

*8. A printer device as claimed in claim 7, wherein the web-shaped recording media is provided with synchronization marks and further comprising:*

*a reader mounted to read the synchronization marks.*

*9. A method for printing web-shaped recording media, comprising the steps of:*

*providing an intermediate carrier that is of a width at least twice a width of the web-shaped recording media;*

*generating a first side latent image on a first portion of said intermediate carrier;*

*developing the first side latent image on the intermediate carrier to provide a first side developed image;*

*conveying the web-shaped recording media with a first side of the web-shaped recording media against said first portion of said intermediate carrier;*

*transferring the first side developed image from the first portion of said intermediate carrier to the first side of the web-shaped recording media;*

*generating a second side latent image on a second portion of said intermediate carrier;*

*developing said second side latent image on said intermediate carrier to provide a second side developed image;*

*deflecting the web-shaped recording media to convey said a second side of the web-shaped recording media against said second portion of said intermediate carrier;*

*transferring the second side developed image from the second portion of said intermediate carrier to the second side of the web-shaped recording media;*

*fixing the images on the web-shaped recording media;*

*wherein said conveying step includes engaging margin perforations of the web-shaped recording media.*

*10. A method for printing web-shaped recording media, comprising the steps of:*

*providing an intermediate carrier that is of a width at least twice a width of a web-shaped recording media;*

*generating a first latent image on a first portion of the intermediate carrier;*

*generating a second latent image on a second portion of the intermediate carrier;*

*developing the first latent image on the intermediate carrier to provide a first developed image;*

*developing the second latent image on the intermediate carrier to provide a second developed image;*

*conveying a first web-shaped recording media against the first portion of the intermediate carrier;*

*conveying a second web-shaped recording media against the second portion of the intermediate carrier;*

*transferring the first developed image from the first portion of the intermediate carrier to the first web-shaped recording media;*

*transferring the second developed image from the second portion of the intermediate carrier to the second web-shaped recording media;*

*fixing the first developed image on the first web-shaped recording media;*

*fixing the second developed image on the second web-shaped recording media;*

*wherein said first and second web-shaped recording media are a same side of a same web-shaped recording media, and*

*said first and second developed images are of mutually different colors so that two color printing is performed on the web-shaped recording media.*

* * * * *